US012516577B2

(12) United States Patent
Fripp et al.

(10) Patent No.: US 12,516,577 B2
(45) Date of Patent: Jan. 6, 2026

(54) TEXTURED SURFACES OF EXPANDING METAL FOR CENTRALIZER, MIXING, AND DIFFERENTIAL STICKING

(71) Applicant: Halliburton Energy Services, Inc., Houston, TX (US)

(72) Inventors: Michael Linley Fripp, Carrollton, TX (US); Andrew Penno, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 652 days.

(21) Appl. No.: 16/804,258

(22) Filed: Feb. 28, 2020

(65) Prior Publication Data

US 2021/0270093 A1 Sep. 2, 2021

(51) Int. Cl.
*E21B 17/10* (2006.01)
*F16L 1/10* (2006.01)

(52) U.S. Cl.
CPC .......... *E21B 17/1078* (2013.01); *E21B 17/10* (2013.01); *E21B 17/1014* (2013.01); *F16L 1/10* (2013.01)

(58) Field of Classification Search
CPC .. E21B 17/10; E21B 17/1078; E21B 17/1014; F16L 1/10
See application file for complete search history.

(56) References Cited

U.S. PATENT DOCUMENTS 1,525,740 A 2/1925 Howard
2,075,912 A 4/1937 Roye
2,590,931 A 4/1952 Cabaniss
2,743,781 A 5/1956 Lane
2,865,454 A 12/1958 Richards
3,206,536 A 9/1965 Goodloe
3,371,716 A 3/1968 Current
3,616,354 A 10/1971 Russell
3,706,125 A 12/1972 Hopkins
4,270,608 A 6/1981 Hendrickson
4,424,859 A 1/1984 Sims
4,424,861 A 1/1984 Carter
4,442,908 A 4/1984 Steenbock
4,446,932 A 5/1984 Hipp
4,457,379 A 7/1984 McStravick
4,527,815 A 7/1985 Frick
4,977,636 A 12/1990 King
4,979,585 A 12/1990 Chesnutt
(Continued)

FOREIGN PATENT DOCUMENTS

CA 2820742 A1 9/2013
CN 203308412 U 11/2013
(Continued)

*Primary Examiner* — Yong-Suk (Philip) Ro
(74) *Attorney, Agent, or Firm* — Scott Richardson; Parker Justiss, P.C.

(57) ABSTRACT

Provided is an expandable metal centralizer for use in a wellbore. The expandable metal centralizer, in one aspect, includes a downhole tubular positionable on a downhole conveyance in a wellbore. In accordance with this aspect, the expandable metal centralizer additionally includes one or more wellbore centralizing elements radially extending from the downhole tubular, wherein at least one of the downhole tubular or the one or more wellbore centralizing elements comprises a metal configured to expand in response to hydrolysis.

40 Claims, 7 Drawing Sheets

(56) References Cited

Figure 1:
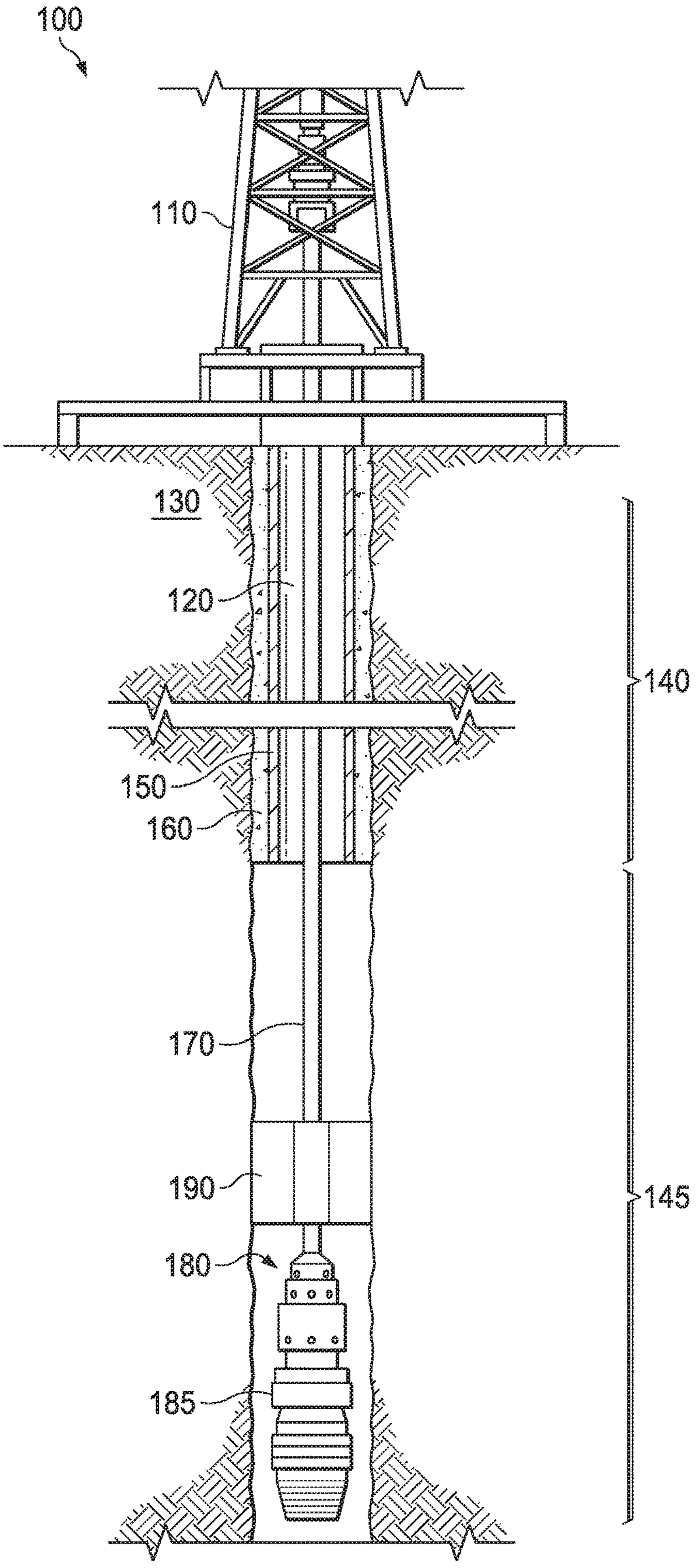

U.S. PATENT DOCUMENTS 5,139,274 A 8/1992 Oseman
5,220,959 A 6/1993 Vance
5,424,139 A 6/1995 Shuler
5,492,173 A 2/1996 Kilgore
5,517,981 A 5/1996 Taub et al.
5,662,341 A 9/1997 Ezell et al.
5,667,015 A 9/1997 Harestad
5,803,173 A 9/1998 Fraser et al.
6,089,320 A 7/2000 LaGrange
6,106,024 A 8/2000 Herman et al.
6,840,325 B2 1/2005 Stephenson
6,907,930 B2 6/2005 Cavender
6,942,039 B2 9/2005 Tinker
7,104,322 B2 9/2006 Whanger et al.
7,152,687 B2 12/2006 Gano
7,322,408 B2 1/2008 Howlett
7,347,274 B2 3/2008 Patel
7,350,590 B2 4/2008 Hosie et al.
7,402,277 B2 7/2008 Ayer
7,578,043 B2 8/2009 Simpson et al.
7,673,688 B1 3/2010 Jones
7,677,303 B2 3/2010 Coronado
7,696,275 B2 4/2010 Slay et al.
7,963,321 B2 6/2011 Kutac
7,996,945 B2 8/2011 Nosker
8,042,841 B2 10/2011 Viegener
8,109,339 B2 2/2012 Xu
8,225,861 B2 7/2012 Foster et al.
8,266,751 B2 9/2012 He
8,430,176 B2 4/2013 Xu
8,453,736 B2 6/2013 Constantine
8,459,367 B2 6/2013 Nutley et al.
8,469,084 B2 6/2013 Clark et al.
8,490,707 B2 7/2013 Robisson
8,579,024 B2 11/2013 Mailand et al.
8,684,096 B2 4/2014 Harris
8,794,330 B2 8/2014 Stout
8,807,209 B2 8/2014 King
8,875,800 B2 11/2014 Wood et al.
8,894,070 B2 11/2014 Bhat et al.
8,993,491 B2 3/2015 James
9,004,173 B2 4/2015 Richard
9,217,311 B2 12/2015 Slup
9,249,904 B2 2/2016 Duquette
9,279,295 B2 3/2016 Williamson et al.
9,347,272 B2 5/2016 Hewson et al.
9,353,606 B2 5/2016 Bruce et al.
9,393,601 B2 7/2016 Ranck
9,404,030 B2 8/2016 Mazyar
9,534,460 B2 1/2017 Watson et al.
9,611,715 B1 4/2017 Smith
9,644,459 B2 5/2017 Themig
9,708,880 B2 7/2017 Solhaug
9,725,979 B2 8/2017 Mazyar et al.
9,732,578 B2 8/2017 McRobb
9,745,451 B2 8/2017 Zhao et al.
9,765,595 B2 9/2017 Themig et al.
9,771,510 B2 9/2017 James et al.
9,945,190 B2 4/2018 Crowley
9,976,380 B2 5/2018 Davis et al.
9,976,381 B2 5/2018 Martin et al.
10,030,467 B2 7/2018 Al-Gouhi
10,060,225 B2 8/2018 Wolf
10,119,011 B2 11/2018 Zhao et al.
10,179,873 B1 1/2019 Meng
10,316,601 B2 6/2019 Walton et al.
10,337,298 B2 7/2019 Braddick
10,344,570 B2 7/2019 Steele
10,352,109 B2 7/2019 Sanchez
10,364,636 B2 7/2019 Davis
10,472,933 B2 11/2019 Steele
10,533,392 B2 1/2020 Walton et al.
10,718,183 B2 7/2020 Bruce et al.
10,758,974 B2 9/2020 Sherman
10,794,152 B2 10/2020 Lang et al.
10,961,804 B1 3/2021 Fripp
11,359,448 B2 6/2022 Fripp
11,365,611 B2 6/2022 Gibb
11,428,066 B2 8/2022 Andersen
11,512,552 B2 11/2022 Fripp
2002/0088616 A1 7/2002 Swor et al.
2003/0132001 A1 7/2003 Wilson
2003/0164236 A1 9/2003 Thornton
2003/0164237 A1 9/2003 Butterfield, Jr.
2003/0205377 A1 11/2003 Streater
2004/0194970 A1 10/2004 Eatwell
2005/0051333 A1 3/2005 Weber
2005/0061369 A1 3/2005 De Almeida
2005/0072576 A1 4/2005 Henriksen
2005/0093250 A1 5/2005 Santi et al.
2005/0199401 A1 9/2005 Patel et al.
2006/0144591 A1 7/2006 Gonzalez
2006/0272806 A1 12/2006 Wilkie et al.
2007/0089875 A1 4/2007 Steele et al.
2007/0089910 A1 4/2007 Hewson et al.
2007/0095532 A1 5/2007 Head
2007/0137826 A1 6/2007 Bosma et al.
2007/0144734 A1 6/2007 Xu et al.
2007/0151724 A1 7/2007 Ohmer et al.
2007/0163781 A1 7/2007 Walker
2007/0221387 A1 9/2007 Levy
2007/0246213 A1 10/2007 Hailey
2007/0267824 A1 11/2007 Baugh et al.
2007/0277979 A1 12/2007 Todd et al.
2008/0047708 A1 2/2008 Spencer
2008/0135249 A1 6/2008 Fripp
2008/0149351 A1 6/2008 Marya
2008/0290603 A1 11/2008 Laflin
2009/0014173 A1 1/2009 Macleod
2009/0084555 A1 4/2009 Lee
2009/0102133 A1 4/2009 Ruddock
2009/0159278 A1 6/2009 Corre
2009/0200028 A1 8/2009 Dewar
2009/0250227 A1 10/2009 Brown et al.
2009/0250228 A1 10/2009 Loretz
2009/0272546 A1 11/2009 Nutley et al.
2009/0321087 A1 12/2009 Victorov
2010/0072711 A1 3/2010 Doane
2010/0078173 A1 4/2010 Buytaert et al.
2010/0096143 A1 4/2010 Angman
2010/0108148 A1 5/2010 Chen
2010/0122819 A1 5/2010 Wildman
2010/0139930 A1 6/2010 Patel
2010/0155083 A1 6/2010 Lynde et al.
2010/0181080 A1 7/2010 Levy
2010/0225107 A1 9/2010 Tverlid
2010/0257913 A1 10/2010 Storm, Jr. et al.
2010/0307737 A1 12/2010 Mellemstrand
2011/0061876 A1 3/2011 Johnson et al.
2011/0098202 A1 4/2011 James
2011/0147014 A1 6/2011 Chen et al.
2012/0018143 A1 1/2012 Lembcke
2012/0048531 A1 3/2012 Marzouk
2012/0048561 A1 3/2012 Holderman
2012/0048623 A1 3/2012 Lafuente et al.
2012/0049462 A1 3/2012 Pitman
2012/0168147 A1 7/2012 Bowersock
2012/0175134 A1 7/2012 Robisson
2012/0273236 A1 11/2012 Gandikota et al.
2013/0048289 A1 2/2013 Mazyar et al.
2013/0056207 A1 3/2013 Wood et al.
2013/0081815 A1 4/2013 Mazyar et al.
2013/0152824 A1 6/2013 Crews
2013/0153236 A1 6/2013 Bishop
2013/0161006 A1 6/2013 Robisson et al.
2013/0186615 A1 7/2013 Hallunbaek et al.
2013/0192853 A1 8/2013 Themig
2013/0292117 A1 11/2013 Robisson
2014/0026335 A1 1/2014 Smith
2014/0034308 A1 2/2014 Holderman
2014/0051612 A1* 2/2014 Mazyar .................. E21B 33/12
507/269
2014/0262352 A1 9/2014 Lembcke
2015/0021049 A1 1/2015 Davis et al.

(56) References Cited

U.S. PATENT DOCUMENTS

2015/0075768 A1 3/2015 Wright et al.
2015/0101813 A1 4/2015 Zhao
2015/0113913 A1 4/2015 Kim
2015/0184486 A1 7/2015 Epstein
2015/0233190 A1 8/2015 Wolf et al.
2015/0275587 A1 10/2015 Wolf et al.
2015/0337615 A1 11/2015 Epstein et al.
2015/0345248 A1 12/2015 Carragher
2015/0368990 A1 12/2015 Jewett
2015/0369003 A1 12/2015 Hajjari et al.
2016/0024896 A1 1/2016 Johnson et al.
2016/0024902 A1 1/2016 Richter
2016/0137912 A1 5/2016 Sherman et al.
2016/0138359 A1 5/2016 Zhao
2016/0145488 A1 5/2016 Aines et al.
2016/0145968 A1 5/2016 Marya
2016/0177668 A1 6/2016 Watson et al.
2016/0194936 A1 7/2016 Allen
2016/0208569 A1 7/2016 Anderson et al.
2016/0230495 A1 8/2016 Mazyar et al.
2016/0273312 A1 9/2016 Steele et al.
2016/0319633 A1 11/2016 Cooper et al.
2016/0326830 A1 11/2016 Hallundbaek
2016/0326849 A1 11/2016 Bruce
2016/0333187 A1 11/2016 Bauer et al.
2017/0015824 A1 1/2017 Gozalo
2017/0022778 A1 1/2017 Fripp et al.
2017/0107419 A1 4/2017 Roy et al.
2017/0107794 A1 4/2017 Steele
2017/0113275 A1 4/2017 Roy et al.
2017/0159401 A1 6/2017 Saltel et al.
2017/0175487 A1 6/2017 Marcin et al.
2017/0175488 A1 6/2017 Lisowski
2017/0191342 A1 7/2017 Turley
2017/0198191 A1 7/2017 Potapenko
2017/0234103 A1 8/2017 Frazier
2017/0306714 A1 10/2017 Haugland
2017/0314372 A1 11/2017 Tolman
2017/0350237 A1 12/2017 Giem et al.
2017/0356266 A1 12/2017 Arackakudiyil
2018/0023362 A1 1/2018 Makowiecki et al.
2018/0023366 A1 1/2018 Deng et al.
2018/0038193 A1 2/2018 Walton
2018/0080304 A1 3/2018 Cortez et al.
2018/0081468 A1 3/2018 Bruce et al.
2018/0086894 A1 3/2018 Roy
2018/0087350 A1 3/2018 Sherman
2018/0094508 A1 4/2018 Smith et al.
2018/0100367 A1 4/2018 Perez
2018/0128072 A1 5/2018 Larsen
2018/0128082 A1 5/2018 Hollan et al.
2018/0209234 A1 7/2018 Manera
2018/0223624 A1 8/2018 Fripp
2018/0298708 A1 10/2018 Schmidt et al.
2018/0334882 A1 11/2018 Brandsdal
2018/0347288 A1 12/2018 Fripp
2018/0363409 A1 12/2018 Frazier
2019/0016951 A1 1/2019 Sherman et al.
2019/0032435 A1 1/2019 Kochanek et al.
2019/0039126 A1* 2/2019 Sherman ................. B22F 1/062
2019/0078414 A1 3/2019 Frazier
2019/0128092 A1 5/2019 Mueller et al.
2019/0136666 A1 5/2019 Kent
2019/0178054 A1 6/2019 Bruce
2019/0186228 A1 6/2019 Beckett et al.
2019/0225861 A1 7/2019 Reddy
2019/0249510 A1 8/2019 Deng et al.
2019/0316025 A1 10/2019 Sherman
2019/0383115 A1 12/2019 Lees
2020/0032574 A1 1/2020 Fripp et al.
2020/0056435 A1 2/2020 Sherman
2020/0072019 A1 3/2020 Onti et al.
2020/0080401 A1 3/2020 Sherman
2020/0080402 A1 3/2020 Lang et al.
2020/0240235 A1 7/2020 Fripp et al.
2020/0308945 A1 10/2020 Surjaatmadja et al.
2020/0325749 A1 10/2020 Fripp et al.
2020/0362224 A1 11/2020 Wellhoefer
2020/0370391 A1 11/2020 Fripp et al.
2021/0017835 A1 1/2021 Pelto et al.
2021/0040810 A1 2/2021 Evers
2021/0123310 A1 4/2021 Fripp et al.
2021/0123319 A1 4/2021 Greci
2021/0172286 A1 6/2021 Barlow
2021/0187604 A1 6/2021 Sherman et al.
2021/0270093 A1 9/2021 Fripp
2021/0270103 A1 9/2021 Greci et al.
2021/0332673 A1 10/2021 Fripp
2021/0363849 A1 11/2021 Al Yahya
2022/0106847 A1 4/2022 Dahl
2022/0186575 A1 6/2022 Fripp
2022/0205336 A1 6/2022 Asthana
2022/0372837 A1 11/2022 Holderman et al.

FOREIGN PATENT DOCUMENTS

CN 205422632 U 8/2016
CN 107148444 A 9/2017
CN 108194756 A 6/2018
CN 107148444 B 1/2019
CN 108194756 B 8/2020
EP 15726 A1 9/1980
EP 869257 A2 10/1998
EP 940558 A1 9/1999
EP 0940558 B1 1/2005
EP 1757770 A1 2/2007
EP 1910728 A1 4/2008
EP 1910728 B1 9/2009
EP 2078132 B1 4/2010
EP 2447466 A2 5/2012
EP 2501890 A2 9/2012
EP 2501890 B 7/2014
EP 2447466 A3 3/2017
EP 3144018 A1 3/2017
EP 3144018 A4 5/2017
EP 3196402 A1 7/2017
EP 3144018 B1 9/2018
EP 2447466 B1 10/2018
GB 2444060 A 5/2008
GB 2444060 B 12/2008
JP 2003090037 A 3/2003
JP 2003293354 A 10/2003
JP 2004169303 A 6/2004
JP 2015175449 A 10/2015
KR 20020014619 A 2/2002
KR 20080096576 A 10/2008
WO 02/02900 A2 1/2002
WO 02/02900 A3 5/2002
WO 02/02900 A8 12/2003
WO 2005/022012 A1 3/2005
WO 2006/045794 A1 5/2006
WO 2007/047089 A1 4/2007
WO 2012/094322 A2 7/2012
WO 2012/125660 A2 9/2012
WO 2012/094322 A3 10/2012
WO 2012/125660 A3 2/2013
WO 2014/028149 A1 2/2014
WO 2014/182301 A1 11/2014
WO 2014/193042 A1 12/2014
WO 2015/057338 A1 4/2015
WO 2015/069886 A2 5/2015
WO 2015/069886 A3 9/2015
WO 2015/183277 A1 12/2015
WO 2016/000068 A1 1/2016
WO 2016/171666 A1 10/2016
WO 2017/100417 A1 6/2017
WO 2018/055382 A1 3/2018
WO 2018085102 A1 5/2018
WO 2019/094044 A1 5/2019
WO 2019/122857 A1 6/2019
WO 2019/147285 A1 8/2019
WO 2019/151870 A1 8/2019
WO 2019/164499 A1 8/2019
WO 2020/005252 A1 1/2020

(56) References Cited

FOREIGN PATENT DOCUMENTS

| | | | |
|---|---|---|---|
| WO | 2020/141203 | A1 | 7/2020 |
| WO | 2019/164499 | A8 | 8/2020 |
| WO | 2020/167288 | A1 | 8/2020 |
| WO | 2020/204940 | A1 | 10/2020 |
| WO | 2021/034325 | A1 | 2/2021 |
| WO | 2021/086317 | A1 | 5/2021 |
| WO | 2021/096519 | A1 | 5/2021 |
| WO | 2021/126279 | A1 | 6/2021 |

* cited by examiner

TEXTURED SURFACES OF EXPANDING METAL FOR CENTRALIZER, MIXING, AND DIFFERENTIAL STICKING

BACKGROUND

Wellbores are sometimes drilled into subterranean formations that contain hydrocarbons to allow recovery of the hydrocarbons. Some wellbore servicing methods employ wellbore tubulars that are lowered into the wellbore for various purposes throughout the life of the wellbore. Since wellbores are not generally perfectly vertical, centralizers are used to maintain the wellbore tubulars aligned within the wellbore. Alignment may help prevent any friction between the wellbore tubular and the side of the wellbore wall or casing, potentially reducing any damage that may occur.

BRIEF DESCRIPTION

Reference is now made to the following descriptions taken in conjunction with the accompanying drawings, in which:

FIG. 1 is a perspective view of a well system including an exemplary operating environment that the apparatuses, systems and methods disclosed herein may be employed; and FIGS. 2-12 illustrate various different configurations for an expandable metal centralizer designed and manufactured according to the disclosure.

DETAILED DESCRIPTION

In the drawings and descriptions that follow, like parts are typically marked throughout the specification and drawings with the same reference numerals, respectively. The drawn figures are not necessarily, but may be, to scale. Certain features of the disclosure may be shown exaggerated in scale or in somewhat schematic form and some details of certain elements may not be shown in the interest of clarity and conciseness.

The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results. Moreover, all statements herein reciting principles and aspects of the disclosure, as well as specific examples thereof, are intended to encompass equivalents thereof. Additionally, the term, "or," as used herein, refers to a non-exclusive or, unless otherwise indicated.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "uphole," "upstream," or other like terms shall be construed as generally toward the surface of the well; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical or horizontal axis. Unless otherwise specified, use of the term "subterranean formation" shall be construed as encompassing both areas below exposed earth and areas below earth covered by water, such as ocean or fresh water.

Referring to FIG. 1, depicted is a perspective view of a well system 100 including an exemplary operating environment that the apparatuses, systems and methods disclosed herein may be employed. For example, the well system 100 could use an expandable metal centralizer according to any of the embodiments, aspects, applications, variations, designs, etc. disclosed in the following paragraphs. The well system 100 illustrated in FIG. 1 includes a rig 110 extending over and around a wellbore 120 formed in a subterranean formation 130. As those skilled in the art appreciate, the wellbore 120 may be fully cased, partially cased, or an open hole wellbore. In the illustrated embodiment of FIG. 1, the wellbore 120 is partially cased, and thus includes a cased region 140 and an open hole region 145. The cased region 140, as is depicted, may employ casing 150 that is held into place by cement 160.

The well system 100 illustrated in FIG. 1 additionally includes a downhole conveyance 170 deploying a downhole tool assembly 180 within the wellbore 120. The downhole conveyance 170 can be, for example, tubing-conveyed, wireline, slickline, drill pipe, production tubing, work string, or any other suitable means for conveying the downhole tool assembly 180 into the wellbore 120. In one particular advantageous embodiment, the downhole conveyance 170 is American Petroleum Institute "API" pipe.

The downhole tool assembly 180, in the illustrated embodiment, includes a downhole tool 185 and an expandable metal centralizer 190. The downhole tool 185 may comprise any downhole tool that could be positioned and/or anchored within a wellbore. Certain downhole tools 185 that may find particular use in the well system 100 include, without limitation, sealing packers, elastomeric sealing packers, non-elastomeric sealing packers (e.g., including plastics such as PEEK, metal packers such as inflatable metal packers, as well as other related packers), liners, an entire lower completion, one or more tubing strings, one or more screens, one or more production sleeves, etc.

The expandable metal centralizer 190, in accordance with one embodiment of the disclosure, includes a downhole tubular positioned on the downhole conveyance 170. The expandable metal centralizer 190, in accordance with this embodiment, additionally includes one or more wellbore centralizing elements radially extending from the downhole tubular. Further to this embodiment, at least one of the downhole tubular or the one or more wellbore centralizing elements comprises a metal configured to expand in response to hydrolysis. The expanding metal, in some embodiments, may be described as expanding to a cement like material. In other words, the metal goes from metal to micron-scale particles and then these particles expand and lock together to, in essence, lock the expandable metal centralizer 190 in place. The reaction may, in certain embodiments, occur in less than 2 days in a reactive fluid and in downhole temperatures. Nevertheless, the time of reaction may vary depending on the reactive fluid, the expandable metal used, and the downhole temperature.

In some embodiments the reactive fluid may be a brine solution such as may be produced during well completion activities, and in other embodiments, the reactive fluid may be one of the additional solutions discussed herein. The metal, pre-expansion, is electrically conductive in certain embodiments. The metal may be machined to any specific size/shape, extruded, formed, cast or other conventional ways to get the desired shape of a metal, as will be discussed in greater detail below. Metal, pre-expansion, in certain embodiments has a yield strength greater than about 8,000 psi, e.g., 8,000 psi+/−50%.

The hydrolysis of any metal can create a metal hydroxide. The formative properties of alkaline earth metals (Mg—Magnesium, Ca—Calcium, etc.) and transition metals (Zn—Zinc, Al —Aluminum, etc.) under hydrolysis reactions demonstrate structural characteristics that are favorable for use with the present disclosure. Hydration results in an increase in size from the hydration reaction and results in a metal hydroxide that can precipitate from the fluid.

The hydration reactions for magnesium is:

$$Mg+2H_2O \rightarrow Mg(OH)_2+H_2,$$

where $Mg(OH)_2$ is also known as brucite. Another hydration reaction uses aluminum hydrolysis. The reaction forms a material known as Gibbsite, bayerite, and norstrandite, depending on form. The hydration reaction for aluminum is:

$$Al+3H_2O \rightarrow Al(OH)_3+3/2\ H_2.$$

Another hydration reactions uses calcium hydrolysis. The hydration reaction for calcium is:

$$Ca+2H_2O \rightarrow Ca(OH)_2+H_2,$$

Where Ca (OH) 2 is known as portlandite and is a common hydrolysis product of Portland cement. Magnesium hydroxide and calcium hydroxide are considered to be relatively insoluble in water. Aluminum hydroxide can be considered an amphoteric hydroxide, which has solubility in strong acids or in strong bases.

In an embodiment, the metallic material used can be a metal alloy. The metal alloy can be an alloy of the base metal with other elements in order to either adjust the strength of the metal alloy, to adjust the reaction time of the metal alloy, or to adjust the strength of the resulting metal hydroxide byproduct, among other adjustments. The metal alloy can be alloyed with elements that enhance the strength of the metal such as, but not limited to, Al—Aluminum, Zn—Zinc, Mn—Manganese, Zr—Zirconium, Y—Yttrium, Nd—Neodymium, Gd—Gadolinium, Ag—Silver, Ca—Calcium, Sn—Tin, and Re—Rhenium, Cu—Copper. In some embodiments, the alloy can be alloyed with a dopant that promotes corrosion, such as Ni—Nickel, Fe—Iron, Cu—Copper, Co—Cobalt, Ir—Iridium, Au—Gold, C—Carbon, gallium, indium, mercury, bismuth, tin, and Pd—Palladium. The metal alloy can be constructed in a solid solution process where the elements are combined with molten metal or metal alloy. Alternatively, the metal alloy could be constructed with a powder metallurgy process. The metal can be cast, forged, extruded, sintered, mill machined, lathe machined, stamped, eroded or a combination thereof.

Optionally, non-expanding components may be added to the starting metallic materials. For example, ceramic, elastomer, plastic, epoxy, glass, or non-reacting metal components can be embedded in the expanding metal or coated on the surface of the metal. Alternatively, the starting metal may be the metal oxide. For example, calcium oxide (CaO) with water will produce calcium hydroxide in an energetic reaction. Due to the higher density of calcium oxide, this can have a 260% volumetric expansion where converting 1 mole of CaO goes from 9.5 cc to 34.4 cc of volume. In one variation, the expanding metal is formed in a serpentinite reaction, a hydration and metamorphic reaction. In one variation, the resultant material resembles a mafic material.

Additional ions can be added to the reaction, including silicate, sulfate, aluminate, and phosphate. The metal can be alloyed to increase the reactivity or to control the formation of oxides.

The expandable metal can be configured in many different fashions, as long as an adequate volume of material is available for fully expanding. For example, the expandable metal may be formed into a single long tube, multiple short tubes, rings, alternating steel and swellable rubber and expandable metal rings, among others. Additionally, a coating may be applied to one or more portions of the expandable metal to delay the expanding reactions.

In practice, the downhole tool assembly 180 can be moved down the wellbore 120 via the downhole conveyance 170 to a desired location. Once the downhole tool assembly 180, including the downhole tool 185 and the expandable metal centralizer 190 reach the desired location, the expandable metal centralizer 190 may be set in place according to the disclosure. In one embodiment, the expandable metal centralizer 190 is subjected to a wellbore fluid sufficient to expand the downhole tubular or one or more wellbore centralizing elements into contact with the wellbore 120 and thereby anchor the one or more downhole tools within the wellbore 120, or alternatively seal the wellbore 120.

In the embodiment of FIG. 1, the expandable metal centralizer 190 is positioned in the open hole region 145 of the wellbore 120. The expandable metal centralizer 190 is particularly useful in open hole situations, as the expandable metal is well suited to adjust to the surface irregularities that may exist in open hole situations. Moreover, the expandable metal, in certain embodiments, may penetrate into the formation of the open hole region 145 and create a bond into the formation, and thus not just at the surface of the formation. Notwithstanding the foregoing, the expandable metal centralizer 190 is also suitable for a cased region 140 of the wellbore 120.

As is illustrated, the exterior surface of the expandable metal centralizer 190 may be textured. In certain instances, the textured surface has a plurality of undulations, crenellations, corrugations, ridges, depressions, or other surface variations where the radial amplitude of the surface variation is at least about 1 mm (e.g., about 0.04 inches). In yet another embodiment, the radial amplitude of the surface variation is at least about 1.25 mm (e.g., about 0.05 inches), and in yet another embodiment the radial amplitude of the surface variation is between about 1.25 mm (e.g., about 0.06 inches) and about 25 mm (e.g., about 1.0 inches). Any known or hereafter discovered method for creating the textured surface is within the scope of the disclosure.

In one example, axial, helical, or circumferential grooves may be placed on the outside diameter of the expandable metal, for example as described below with regard to FIG. 3. These grooves allow increased area for fluid to pass the metal. The grooves in the metal can serve as a static mixer for enhancing the mixing behavior and flow distribution of a circulated fluid. The static mixer can be a flow division process that stirs the fluid. The static mixer can be a rotational circulation that causes radial mixing of the fluid. Mixing the fluid is important in wellbore cleanup because often the low-side of a horizontal well is poorly cleaned and/or poorly cemented. Mixing minimizes the likelihood of problems. In effect, these grooves may extend radially outward from the downhole tubular or radially inward from the downhole tubular to allow the expanding metal packer to act as a mixer and as a centralizer in the time before the metal has chemically reacted.

The texture can be created by embedding components into or onto the expanding metal, as described below with regard to FIGS. 8 and 9. The embedded components can be metal, ceramic, glass, or polymer. In one case, the embedded components are an expanding metal, such as a harder expanding metal that has a slower reaction time. These components can be threaded, bonded, bolted, screwed, brazed, interference fit, tapered, epoxied, or otherwise mechanically coupled to the expanding metal. In one embodiment, steel lugs are threaded into the expanding metal, as described below with regard to FIG. 9. The lugs hold the expanding metal off of the wellbore in order to minimize differential sticking. The lugs also reduce the likelihood of abrasion on the expanding metal during run-in. In another example, ceramic wear buttons are affixed to the exterior surface in order to reduce abrasion during installation. In another example, a PTFE bar is affixed to the exterior surface in order to reduce friction during installation.

In another example, strips of a slower-reacting expanding metal are affixed to the outside diameter, as described below with regard to FIG. 5. In another example, the surface of the expanding metal has a waffled surface with a combination of grooves, for example as described below with regard to FIG. 11. The surface can also feature divots, treads, bumps, or ridges. The features can be square, sloped, or curved in profile with convex or concave aspects.

Figure 2:
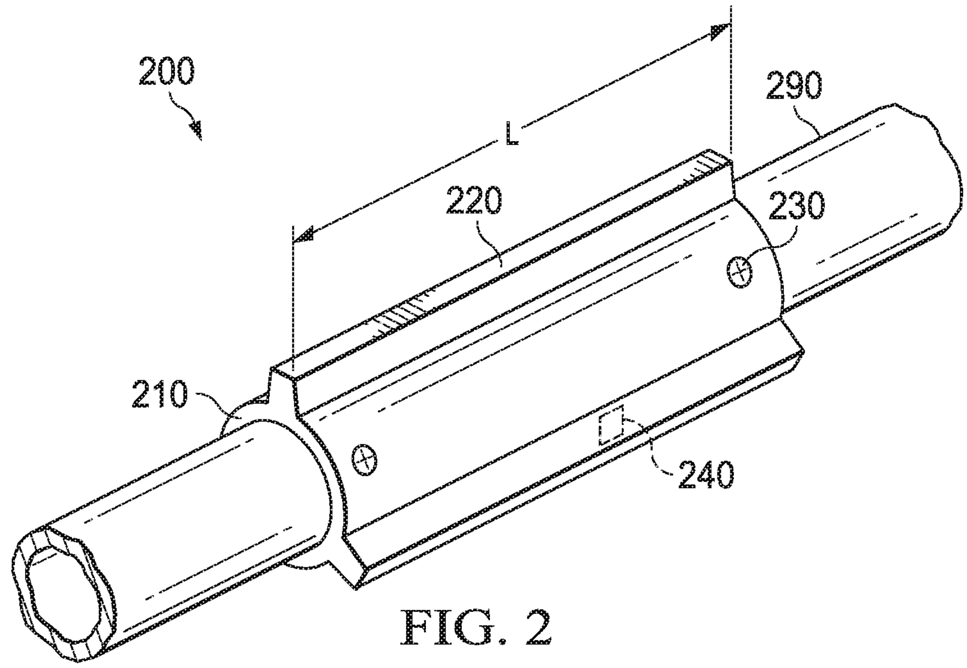

Turning to FIGS. 2-12, illustrated are various different configurations for an expandable metal centralizer designed and manufactured according to the disclosure. Turning initially to FIG. 2, illustrated is one embodiment of an expandable metal centralizer 200 designed and manufactured according to the disclosure. In accordance with the disclosure, the expandable metal centralizer 200 is positionable on, or positioned on as is the case in FIG. 2, a downhole conveyance 290. While the downhole conveyance 290 can be wireline, slickline, coiled tubing, work string, or any other suitable means for conveying downhole tools within a wellbore, the downhole conveyance 290 illustrated in FIG. 2 is API pipe.

In accordance with one embodiment of the disclosure, the expandable metal centralizer 200 includes a downhole tubular 210. The downhole tubular 210, in the illustrated embodiment, is positioned on the downhole conveyance 290. The expandable metal centralizer 200, in the illustrated embodiment of FIG. 2, further includes one or more wellbore centralizing elements 220 radially extending from the downhole tubular 210. In accordance with this embodiment, at least one of the downhole tubular 210 or the one or more wellbore centralizing elements 220 elements comprises a metal configured to expand in response to hydrolysis, as discussed in detail above.

In the embodiment illustrated in FIG. 2, the downhole tubular 210 and the one or more wellbore centralizing elements 220 are integrally formed with each other. Such may be the case when the downhole tubular 210 and the one or more wellbore centralizing elements 220 are formed as a single unit in a single manufacturing process. Accordingly, the downhole tubular 210 and the one or more wellbore centralizing elements 220 could comprise the same material, for example a metal configured to expand in response to hydrolysis. In certain other embodiments, as discussed below, the downhole tubular 210 and the one or more wellbore centralizing elements 220 are not integrally formed with each other, and thus may comprise different materials.

In one embodiment, a combined volume of the expandable metal may be sufficient to expand to anchor one or more downhole tools within the wellbore in response to the hydrolysis. For example, in one embodiment the combined volume of the expandable metal is sufficient to expand to anchor at least about 100,000 Newtons (e.g., about 25,000 lbs.) of weight within the wellbore. In yet another embodiment, the combined volume of the expandable metal is sufficient to expand to anchor at least about 200,000 Newtons (e.g., about 50,000 lbs.) of weight within the wellbore, and in yet another embodiment sufficient to expand to anchor at least about 300,000 Newtons (e.g., about 70,000 lbs.) of weight within the wellbore.

In another embodiment, a combined volume of the expandable metal may be sufficient to expand to seal an annulus between the downhole conveyance 290 and the wellbore casing or wellbore. In one embodiment, the combined volume of the expandable metal is sufficient to expand to seal at least about 1,000 psi of pressure within the annulus. In yet another embodiment, the combined volume of the expandable metal is sufficient to expand to seal at least about 5,000 psi of pressure within the annulus, and in yet another embodiment sufficient to expand to seal at least about 15,000 psi of pressure within the annulus.

In the illustrated embodiment of FIG. 2, the expandable metal centralizer 200 includes three wellbore centralizing elements 220 axially positioned along a length (L) of the downhole tubular 210. Furthermore, in the embodiment of FIG. 2 the three wellbore centralizing elements 220 are substantially equally radially spaced about the downhole tubular 210. The phrase "substantially equally radially spaced," as used in this disclosure, requires that the wellbore centralizing elements 220 be within 30 degrees from perfectly equally radially spaced. Thus, in the embodiment of FIG. 2, the three wellbore centralizing elements 220 are radially spaced from one another by about 120 degrees±30 degrees. In another embodiment, the three wellbore centralizing elements 220 are ideally equally radially spaced about the downhole tubular 210. The phrase "ideally equally radially spaced," as used in this disclosure, requires that the wellbore centralizing elements 220 be within 10 degrees from perfectly equally radially spaced.

The expandable metal centralizer 200 illustrated in FIG. 2, additionally include one or more openings (not shown) extending entirely through a wall thickness of the downhole tubular, for accepting one or more fasteners 230 for fixing the downhole tubular 210 to the downhole conveyance 290. The one or more openings and one or more fasteners 230 may vary in design and remain within the scope of the disclosure. Nevertheless, in the embodiment of FIG. 2, the one or more openings are threaded openings and the one or more fasteners 230 are set screws. The expandable metal centralizer 200 illustrated in FIG. 2 may additionally include electronics and/or sensors 240 positioned in one of the one or more wellbore centralizing elements 220. Those skilled in the art appreciated the different types of electronics, batteries, and/or sensors 240 that might be located in the one or more wellbore centralizing elements 220, and the purpose for including such.

Figure 3:
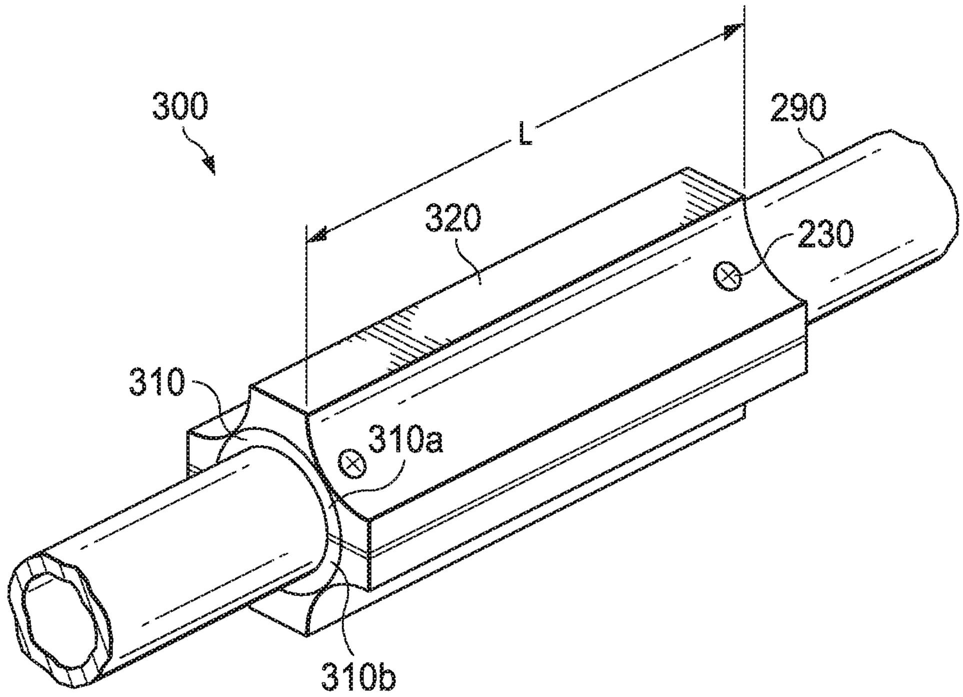

Turning briefly to FIG. 3, illustrated is an alternative embodiment of an expandable metal centralizer 300. The expandable metal centralizer 300 is similar in many respects to the expandable metal centralizer 200. Accordingly, like reference numerals have been used to reference similar, if not identical, features. The expandable metal centralizer 300 differs from the expandable metal centralizer 200 in that its downhole tubular 310 and its one or more wellbore centralizing elements 320 are not integrally formed with one another. Accordingly, the downhole tubular 310 and its one or more wellbore centralizing elements 320 may be formed in different manufacturing steps, and thus comprise different materials. For example, in one embodiment the downhole tubular 310 comprises a metal configured to expand in response to hydrolysis and the one or more wellbore centralizing elements 320 do not comprise a metal configured to expand in response to hydrolysis. In another embodiment, the one or more wellbore centralizing elements 320 comprise a metal configured to expand in response to hydrolysis and the downhole tubular 310 does not comprise a metal configured to expand in response to hydrolysis. In yet another embodiment, the downhole tubular 310 comprises a first metal configured to expand in response to hydrolysis and the one or more wellbore centralizing elements 320 comprise a second metal configured to expand in response to hydrolysis. In certain of these embodiments, the first metal and the second metal are different metals configured to expand at different rates in response to hydrolysis. For example, the first metal might expand at a faster rate and the second metal at a slower rate, or vice-versa. In yet other of these embodiments, the first metal and the second metal are the same metal, and thus expand at a same rate in response to hydrolysis.

The expandable metal centralizer 300 further differs from the expandable metal centralizer 200 in that it employs four wellbore centralizing elements 320, as opposed to three. While general shapes have been given for the four wellbore centralizing elements 320 (and the three wellbore centralizing elements 220), many different shapes may be chosen for various different processes. As those skilled in the art appreciate, the less surface area of the centralizing element that contact any surface there around, the less friction. Accordingly, in many embodiments it is advantageous to reduce the amount of contact surface area, while still achieving their centralizing objective. In another variation, the centralizing elements 320 may have different heights so that the tubing is purposefully positioned at an axis that is offset from the centerline of the wellbore, and thus acts as a decentralizer. Thus, according to one embodiment of the disclosure a decentralizer is considered to be one form of a centralizer.

Additionally, the downhole tubular 310 illustrated in FIG. 3 includes at least two segments 310*a*, 310*b*, that connect (e.g., hinge or lock in one embodiment) with respect to each other to form the tubular. Those skilled in the art appreciate the many different configurations for connections that might be used to achieve the purpose at hand. Accordingly, the downhole tubular 310 may be installed on the downhole conveyance 290 without having to slip it over the end of the downhole conveyance 290.

Figure 4:
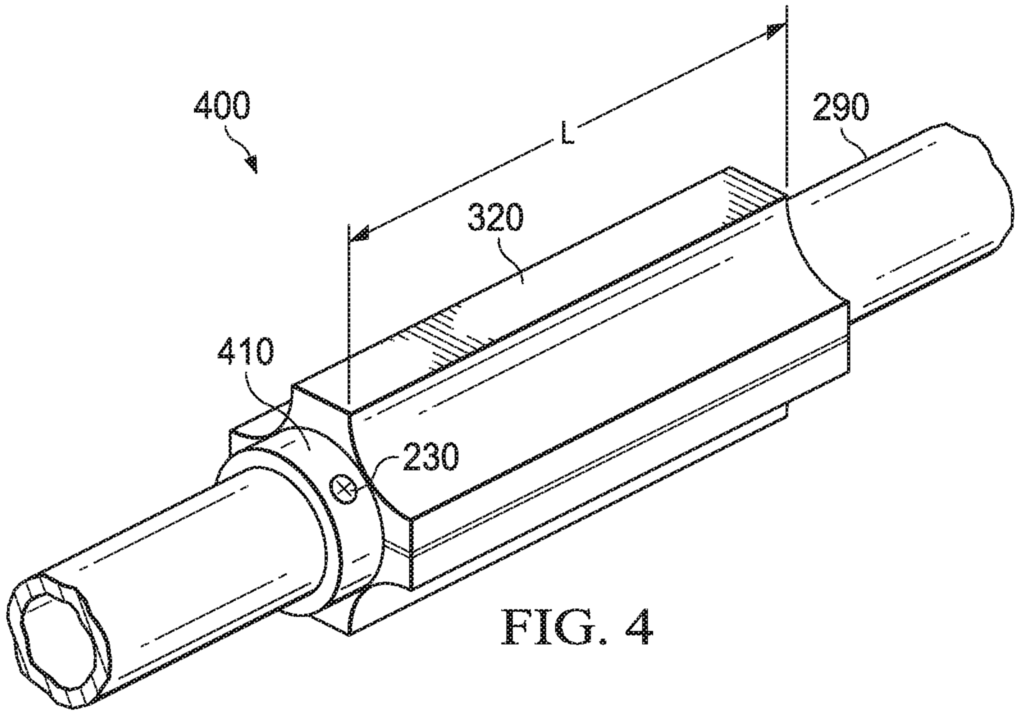

Turning briefly to FIG. 4, illustrated is an alternative embodiment of an expandable metal centralizer 400. The expandable metal centralizer 400 is similar in many respects to the expandable metal centralizer 300. Accordingly, like reference numerals have been used to reference similar, if not identical, features. The expandable metal centralizer 400 includes a pair of retaining rings 410 (only one visible), for example positioned adjacent a proximal end and a distal end of the downhole tubular 310 (not visible as hidden by the retaining rings 410) for axially fixing the downhole tubular 310 on the downhole conveyance 290. In one embodiment, while the pair of retaining rings 410 axially fixes the downhole tubular 310 on the downhole conveyance 290, the pair of retaining rings 410 allows the downhole tubular 310 to spin about the downhole conveyance 290. In another embodiment, the pair of retaining rings 410 axially and rotationally fixes the downhole tubular 310 on the downhole conveyance 290.

In accordance with one embodiment of the disclosure, each of the pair of retaining rings 410 includes one or more threaded openings having one or more set screws 230 therein for axially fixing the downhole tubular 310 to the downhole conveyance 290. In one embodiment, the pair of retaining rings 410 does not comprise a metal configured to expand in response to hydrolysis, but in another embodiment the pair of retaining rings 410 do comprise a metal configured to expand in response to hydrolysis.

Figure 5:
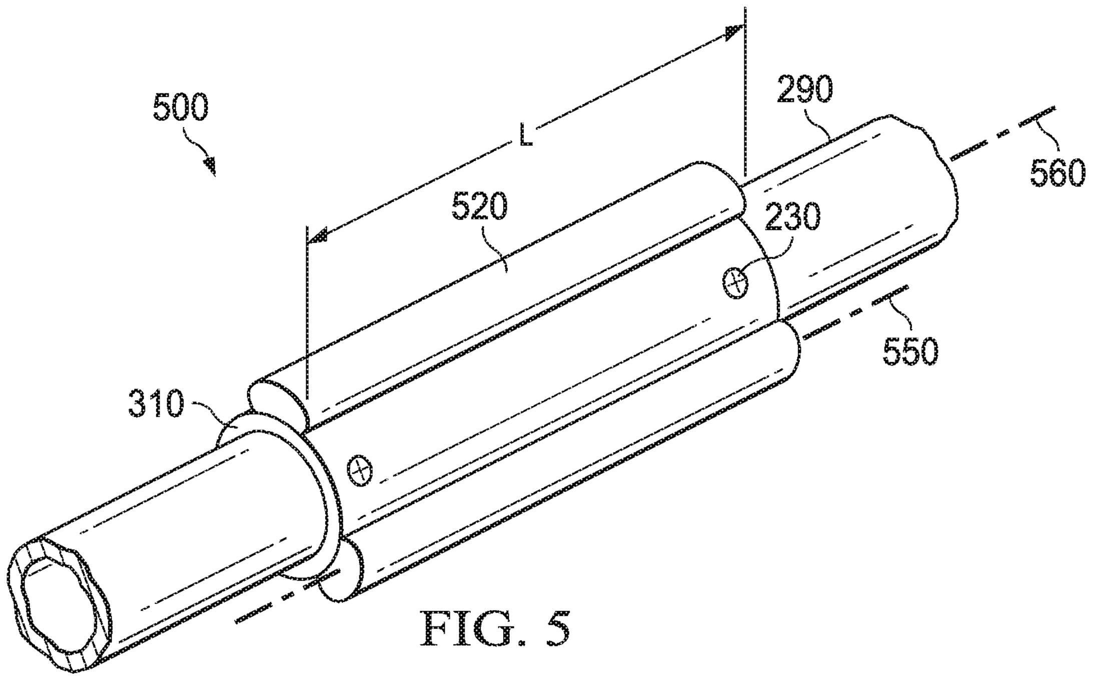

Turning briefly to FIG. 5, illustrated is an alternative embodiment of an expandable metal centralizer 500. The expandable metal centralizer 500 is similar in many respects to the expandable metal centralizer 200. Accordingly, like reference numerals have been used to reference similar, if not identical, features. The expandable metal centralizer 500 includes three individual vanes 520 extending along a length (L) (e.g., the entire length (L) in the embodiment of FIG. 5) of the downhole tubular 310. In accordance with the embodiment of FIG. 5, central axes 550 of the three individual vanes 520 are substantially parallel with a central axis 560 of the downhole tubular 310. The phrase "substantially parallel" as used herein, requires that the central axes 550 of the three individual vanes 520 be within 30 degrees of exactly parallel in all directions with the central axis 560 of the downhole tubular 310. In accordance with another embodiment, the central axes 550 of the three individual vanes 520 are ideally parallel with a central axis 560 of the downhole tubular 310. The phrase "ideally parallel" as used herein, requires that the central axes 550 of the three individual vanes 520 be within 10 degrees of exactly parallel in all directions with the central axis 560 of the downhole tubular 310. The three individual vanes 520 are illustrated in FIG. 5 as solid vanes, but in other embodiments the three individual vanes 520 could be hollow vanes or tubes.

Figure 6:
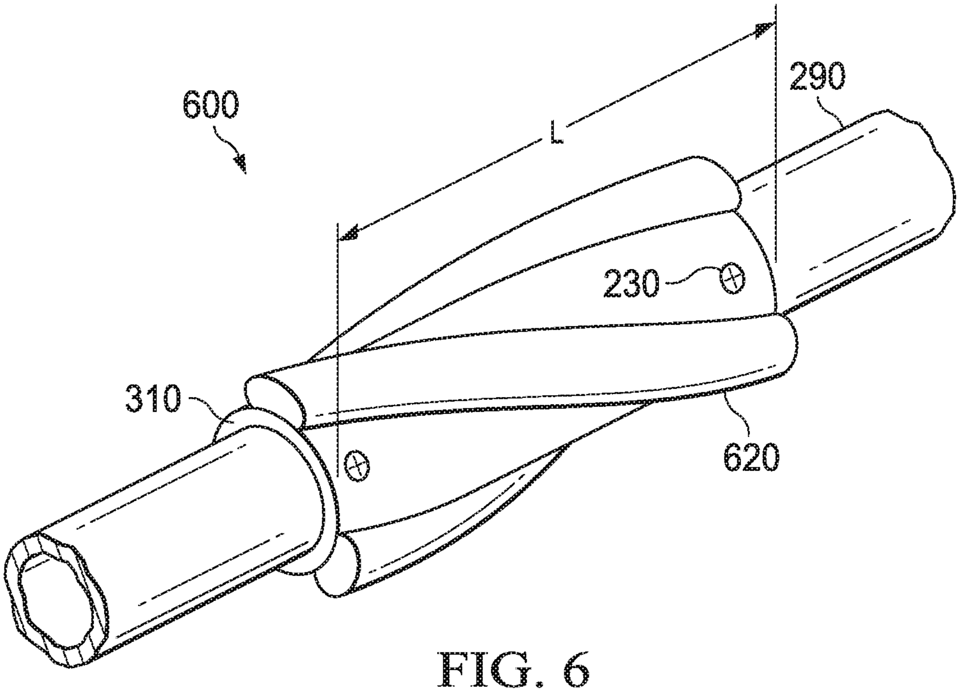

Turning briefly to FIG. 6, illustrated is an alternative embodiment of an expandable metal centralizer 600. The expandable metal centralizer 600 is similar in many respects to the expandable metal centralizer 500. Accordingly, like reference numerals have been used to reference similar, if not identical, features. The expandable metal centralizer 600 differs from the expandable metal centralizer 500, for the most part, in that its three individual vanes 620 spiral around the downhole tubular 310. For example, in the embodiment of FIG. 6, the three individual vanes 620 each spiral around the downhole tubular 310 by approximately 120 degrees. Were only two individual vanes 620 exist, each would spiral around the downhole tubular 310 by approximately 180 degrees.

Figure 7:
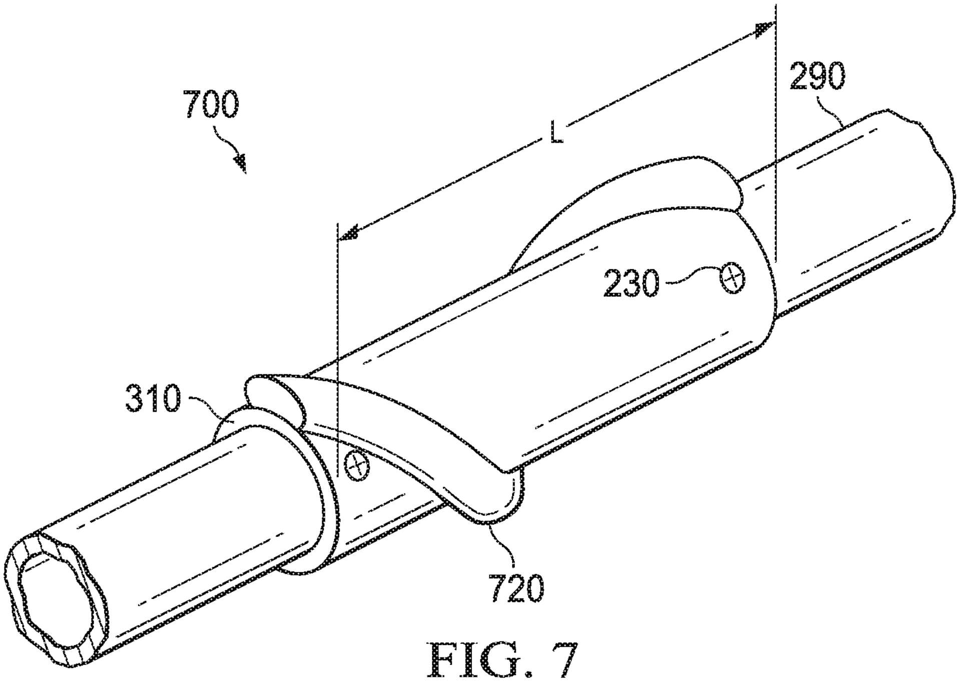

Turning briefly to FIG. 7, illustrated is an alternative embodiment of an expandable metal centralizer 700. The expandable metal centralizer 700 is similar in many respects to the expandable metal centralizer 600. Accordingly, like reference numerals have been used to reference similar, if not identical, features. The expandable metal centralizer 700 differs from the expandable metal centralizer 600, for the most part, in that it includes a single individual vane 720 that spirals around the downhole tubular 310. For example, in the embodiment of FIG. 7, the single individual vane 720 spirals around the downhole tubular 310 by at least 270 degrees, if not a full 360 degrees as shown in FIG. 7. In another embodiment, the single individual vane 720 is substantially parallel to the axis of the tubing and serves to decentralize the tubing.

Figure 8:
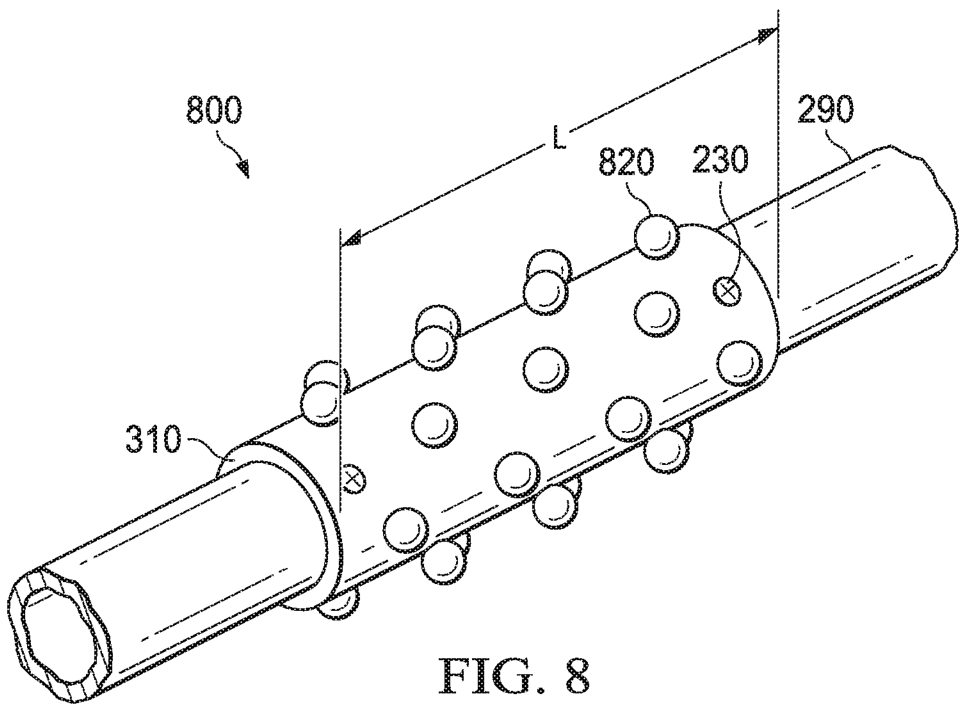

Turning briefly to FIG. 8, illustrated is an alternative embodiment of an expandable metal centralizer 800. The expandable metal centralizer 800 is similar in many respects to the expandable metal centralizer 500. Accordingly, like reference numerals have been used to reference similar, if not identical, features. The expandable metal centralizer 800 differs from the expandable metal centralizer 500, for the most part, in that its one or more wellbore centralizing elements are a plurality of nubs 820 radially extending from and longitudinally spaced about the downhole tubular 310. In accordance with one embodiment, six or more nubs 820 radially extend from and are longitudinally spaced about the downhole tubular 310. In accordance with another embodiment, twelve or more nubs 820 radially extend from and are longitudinally spaced about the downhole tubular 310, and in yet another embodiment twenty-four or more nubs 820 radially extend from and are longitudinally spaced about the downhole tubular 310.

Figure 9:
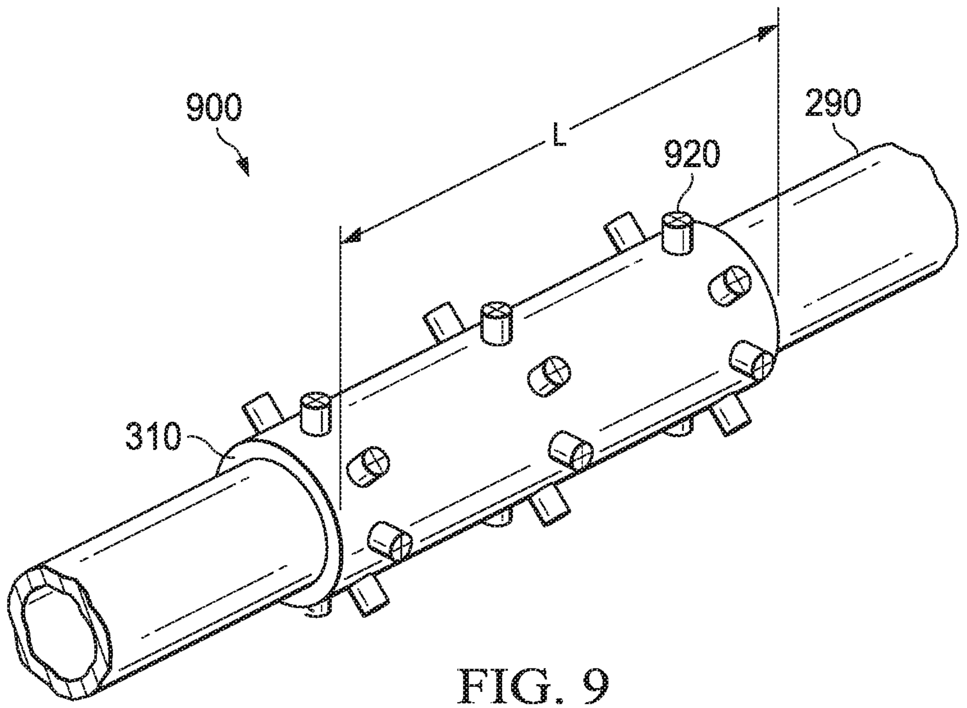

Turning briefly to FIG. 9, illustrated is an alternative embodiment of an expandable metal centralizer 900. The expandable metal centralizer 900 is similar in many respects to the expandable metal centralizer 800. Accordingly, like reference numerals have been used to reference similar, if not identical, features. The expandable metal centralizer 900 differs from the expandable metal centralizer 800, for the most part, in that its one or more wellbore centralizing elements are a plurality of lugs 920 radially extending from and longitudinally spaced about the downhole tubular 310. The lugs 920, in one embodiment, are steel lugs that are threaded into the downhole tubular 310, and thus may additionally be used to fix the downhole tubular 310 to the downhole conveyance 290. In other embodiments, the lugs are ceramic that are affixed with adhesive. The lugs 920 may hold the downhole tubular 310 off of the wellbore in order to minimize differential sticking. The lugs 920 may also reduce the likelihood of abrasion on the downhole tubular 310 during run-in. In accordance with one embodiment, six or more lugs 920 radially extend from and are longitudinally spaced about the downhole tubular 310. In accordance with another embodiment, twelve or more lugs 920 radially extend from and are longitudinally spaced about the downhole tubular 310, and in yet another embodiment twenty-four or more lugs 920 radially extend from and are longitudinally spaced about the downhole tubular 310.

Figure 10:
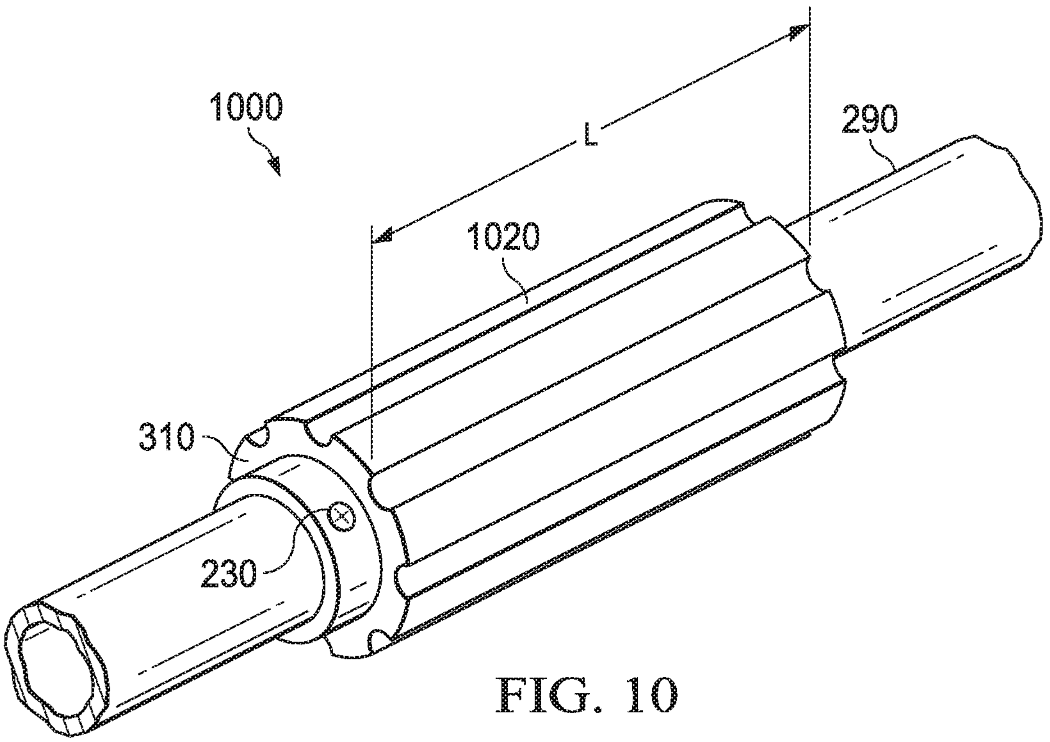

Turning briefly to FIG. 10, illustrated is an alternative embodiment of an expandable metal centralizer 1000. The expandable metal centralizer 1000 is similar in many respects to the expandable metal centralizers 200, 300. Accordingly, like reference numerals have been used to reference similar, if not identical, features. The expandable metal centralizer 1000 differs from the expandable metal centralizers 200, 300, for the most part, in that its one or more wellbore centralizing elements are a plurality of teeth 1020 radially extending from the downhole tubular 310. In accordance with one embodiment, six or more teeth 1020 radially extend from the downhole tubular 310. In accordance with another embodiment, twelve or more teeth 1020 radially extend from the downhole tubular 310, and in yet another embodiment twenty-four or more teeth 1020 radially extend from the downhole tubular 310. The shape of the teeth may vary greatly based upon the design of the expandable metal centralizer 1000, and thus the present disclosure should not be limited to any specific shape.

Figure 11:
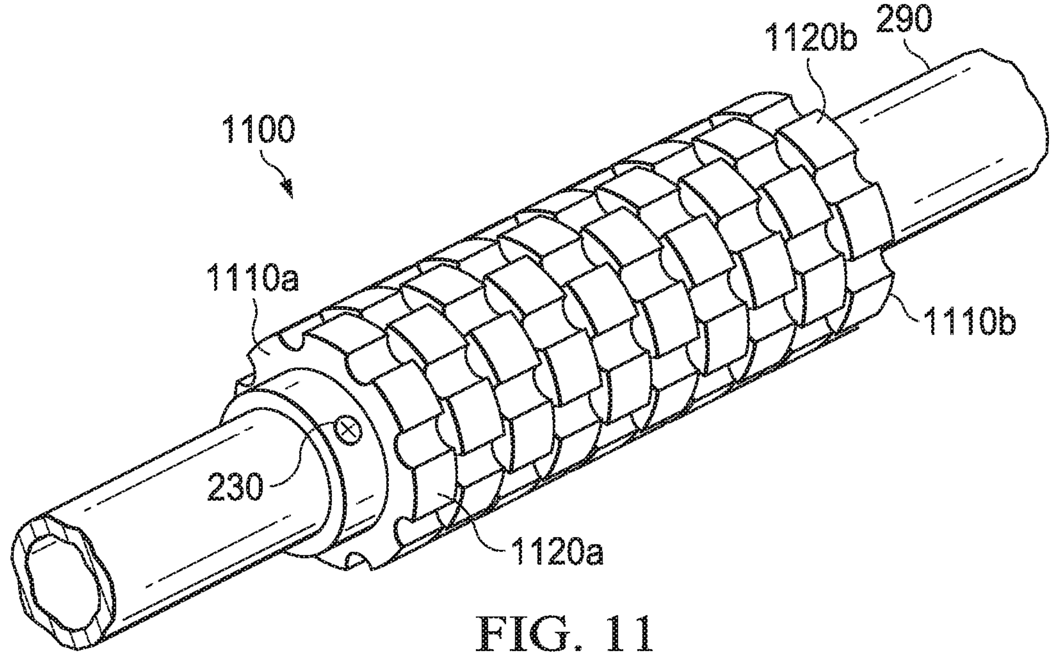

Turning briefly to FIG. 11, illustrated is an alternative embodiment of an expandable metal centralizer 1100. The expandable metal centralizer 1100 is similar in many respects to the expandable metal centralizer 1000. Accordingly, like reference numerals have been used to reference similar, if not identical, features. The expandable metal centralizer 1100 differs from the expandable metal centralizer 1000, for the most part, in that it includes a first downhole tubular 1110*a* having one or more first wellbore centralizing elements 1120*a* radially extending therefrom, as well as a second downhole tubular 1110*b* having one or more second wellbore centralizing elements 1120*b* radially extending therefrom. In fact, in the embodiment of FIG. 11, ten downhole tubulars 1110 and associated wellbore centralizing elements 1120 are stacked next to one another on the downhole conveyance. Nevertheless, any number of downhole tubulars 1110 and associated wellbore centralizing elements 1120 may be used and remain within the scope of the disclosure.

Figure 12:
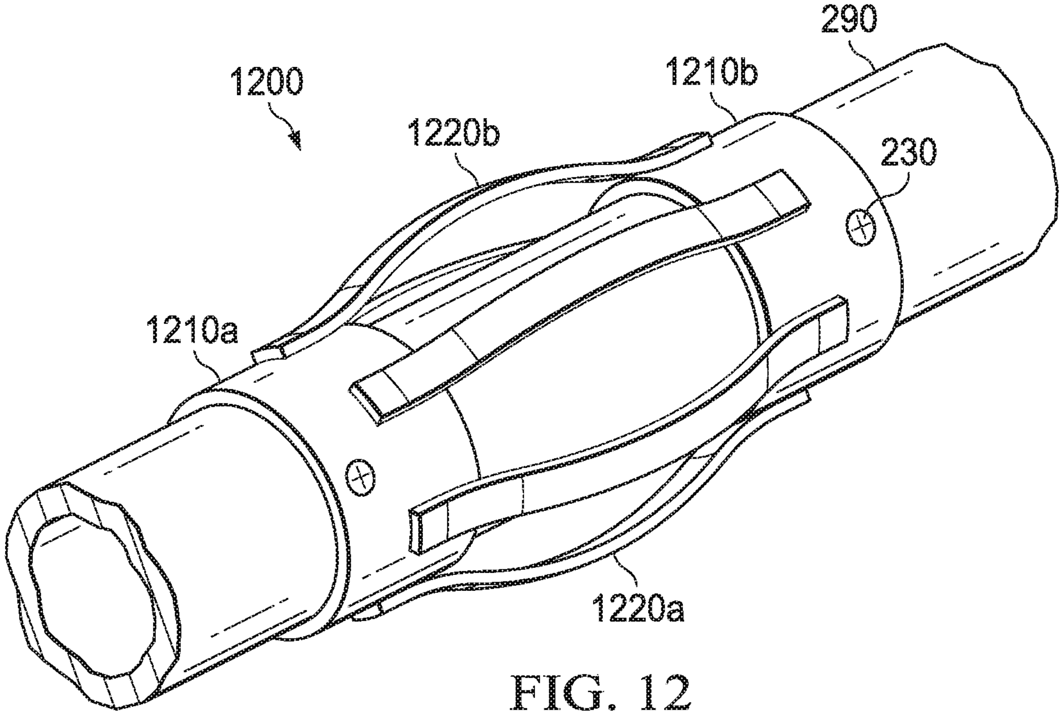

Turning briefly to FIG. 12, illustrated is an alternative embodiment of an expandable metal centralizer 1200. The expandable metal centralizer 1200 is similar in a few respects to the expandable metal centralizer 200. Accordingly, like reference numerals have been used to reference similar, if not identical, features. The expandable metal centralizer 1200 differs from the expandable metal centralizer 200, for the most part, in that the expandable metal centralizer 1200 includes a first downhole tubular 1210*a* and a second downhole tubular 1210*b*, and further wherein the one or more wellbore centralizing elements are one or more bow spring elements 1220*a*, 1220*b* extending between the first and second downhole tubulars 1210*a*, 1210*b*.

In accordance with one embodiment, in each of the embodiments discussed above with respect to FIGS. 2-12, the expandable metal centralizer is run-in-hole in a pre-expansion state (e.g., as a fixed geometry). Again, in accordance with this embodiment, at least one of the downhole tubular or the one or more wellbore centralizing elements comprises the metal configured to expand in response to hydrolysis. Thereafter, with the pre-expansion expandable metal centralizer positioned at a desired location, the pre-expansion expandable metal centralizer may be subjected to a wellbore fluid sufficient to expand the metal into contact with one or more surfaces (e.g., the wellbore casing in one embodiment).

Aspects Disclosed Herein Include:

A. An expandable metal centralizer for use in a wellbore, the expandable metal centralizer including: 1) a downhole tubular positionable on a downhole conveyance in a wellbore; and 2) one or more wellbore centralizing elements radially extending from the downhole tubular, wherein at least one of the downhole tubular or the one or more wellbore centralizing elements comprises a metal configured to expand in response to hydrolysis.

B. A well system, the well system including: 1) a wellbore positioned within a subterranean formation; 2) a downhole conveyance located within the wellbore; and 3) an expandable metal centralizer coupled to the downhole conveyance, the expandable metal centralizer including; 1) a downhole tubular positioned on the downhole conveyance; and b) one or more wellbore centralizing elements radially extending from the downhole tubular, wherein at least one of the downhole tubular or the one or more wellbore centralizing elements comprises a metal configured to expand in response to hydrolysis.

C. A method for centralizing a downhole conveyance, the method including: 1) positioning a downhole conveyance at a desired location within wellbore casing located within a wellbore of a subterranean formation, the downhole conveyance having an pre-expansion expandable metal centralizer coupled thereto, the pre-expansion expandable metal centralizer including; a) a downhole tubular positioned on the downhole conveyance; and b) one or more wellbore centralizing elements radially extending from the downhole tubular, wherein at least one of the downhole tubular or the one or more wellbore centralizing elements comprises a metal configured to expand in response to hydrolysis; and 2) subjecting the pre-expansion expandable metal centralizer to a wellbore fluid to expand the metal into contact with the wellbore casing.

Aspects A, B, and C may have one or more of the following additional elements in combination: Element 1: wherein the downhole tubular comprises a metal configured to expand in response to hydrolysis and the one or more wellbore centralizing elements do not comprise a metal configured to expand in response to hydrolysis. Element 2: wherein the one or more wellbore centralizing elements comprise a metal configured to expand in response to hydrolysis and the downhole tubular does not comprise a metal configured to expand in response to hydrolysis. Element 3: wherein the downhole tubular comprises a first metal configured to expand in response to hydrolysis and the one or more wellbore centralizing elements comprise a second metal configured to expand in response to hydrolysis. Element 4: wherein the first metal and the second metal are different metals configured to expand at different rates in response to hydrolysis. Element 5: wherein the first metal and the second metal are the same metal configured to expand at a same rate in response to hydrolysis. Element 6: wherein the one or more wellbore centralizing elements are integrally formed with the downhole tubular. Element 7: wherein the one or more wellbore centralizing elements are three or more wellbore centralizing elements. Element 8: wherein the three or more wellbore centralizing elements are substantially equally radially spaced about the downhole tubular. Element 9: wherein the three or more wellbore centralizing elements extend along a length (L) of the downhole tubular. Element 10: wherein central axes of the three or more wellbore centralizing elements are substantially parallel to a central axis of the downhole tubular. Element 11: wherein the three or more wellbore centralizing elements spiral around the downhole tubular. Element 12: wherein the downhole tubular includes two segments that connect with respect to each other to form a tubular. Element 13: wherein the downhole tubular further includes one or more openings extending entirely through a wall thickness thereof for accepting a fastener for fixing the downhole tubular to the downhole conveyance. Element 14: wherein the one or more openings are one or more threaded openings having one or more set screws therein for fixing the downhole tubular to the downhole conveyance. Element 15: further including a pair of retaining rings positioned adjacent a proximal end and a distal end of the downhole tubular for axially fixing the downhole tubular on the downhole conveyance. Element 16: wherein each of the pair of retaining rings includes one or more threaded openings having one or more set screws therein for axially fixing the downhole tubular to the downhole conveyance. Element 17: wherein the pair of retaining rings allows the downhole tubular to spin about the downhole conveyance. Element 18: wherein the pair of retaining rings does not comprise the metal configured to expand in response to hydrolysis. Element 19: wherein the one or more wellbore centralizing elements radially extending from the downhole tubular is a single wellbore centralizing element that extends from and spirals at least 270 degrees around the downhole tubular. Element 20: wherein the one or more wellbore centralizing elements radially extending from the downhole tubular are six or more nubs radially extending from and longitudinally spaced about the downhole tubular. Element 21: wherein the one or more wellbore centralizing elements radially extending from the downhole tubular are six or more teeth extending from the downhole tubular. Element 22: wherein the downhole tubular is a first downhole tubular, the one or more wellbore centralizing elements are one or more first wellbore centralizing elements, and the metal is a first metal, and further including: a second downhole tubular positionable on the downhole conveyance in the wellbore; and one or more second wellbore centralizing elements radially extending from the downhole tubular, wherein at least one of the second downhole tubular or the one or more second wellbore centralizing elements comprises a second metal configured to expand in response to hydrolysis. Element 23: wherein the downhole tubular is a first downhole tubular, and further including a second downhole tubular, and further wherein the one or more wellbore centralizing elements are one or more bow spring elements extending between the first and second downhole tubulars. Element 24: wherein a combined volume of the metal is sufficient to expand to anchor one or more downhole tools within the wellbore in response to the hydrolysis. Element 25: wherein the combined volume of the metal is sufficient to expand to anchor at least about 100,000 Newtons of weight within the wellbore. Element 26: wherein a combined volume of the metal is sufficient to expand to seal an annulus between the downhole conveyance and wellbore casing. Element 27: wherein the combined volume of the metal is sufficient to expand to seal at least about 1,000 psi of pressure within the annulus. Element 28: wherein the one or more wellbore centralizing elements extend radially outward from the wellbore tubular. Element 29: wherein, wherein the one or more wellbore centralizing elements extend radially inward from the wellbore tubular. Element 30: wherein the downhole tubular further includes one or more threaded openings having one or more set screws therein for fixing the downhole tubular to the downhole conveyance. Element 31: further including a pair of retaining rings positioned adjacent a proximal end and a distal end of the downhole tubular, wherein each of the pair of retaining rings includes one or more threaded openings having one or more set screws therein for axially fixing the downhole tubular to the downhole conveyance. Element 32: wherein the pair of retaining rings allows the downhole tubular to spin about the downhole conveyance. Element 33: further including wellbore casing located within the wellbore, and further wherein the downhole conveyance is located within the wellbore casing forming an annulus there between, the metal expanded to engage the wellbore casing. Element 34: further including a downhole tool coupled to the downhole conveyance downhole of the expandable metal centralizer. Element 35: wherein the metal is configured to expand in response to one of magnesium hydrolysis, aluminum hydrolysis, calcium hydrolysis, and calcium oxide hydrolysis. Element 36: wherein the hydrolysis forms a structure comprising one of a Brucite, Gibbsite, bayerite, and norstrandite. Element 37: wherein the metal is a magnesium alloy or a magnesium alloy alloyed with at least one of Al, Zn, Mn, Zr, Y, Nd, Gd, Ag, Ca, Sn, and Re.

Those skilled in the art to which this application relates will appreciate that other and further additions, deletions, substitutions and modifications may be made to the described embodiments.

What is claimed is:

1. An expandable metal centralizer for use in a wellbore, comprising:

a downhole tubular positionable on a downhole conveyance in a wellbore; and two or more wellbore centralizing elements circumferentially spaced about and radially extending from the downhole tubular, wherein at least one of the downhole tubular or the two or more wellbore centralizing elements comprises a metal configured to expand in response to hydrolysis, wherein the downhole tubular comprises a first metal configured to expand in response to hydrolysis and the two or more wellbore centralizing elements comprise a second metal configured to expand in response to hydrolysis.

2. The expandable metal centralizer as recited in claim 1, wherein the first metal and the second metal are different metals configured to expand at different rates in response to hydrolysis.

3. The expandable metal centralizer as recited in claim 1, wherein the first metal and the second metal are the same metal configured to expand at a same rate in response to hydrolysis.

4. The expandable metal centralizer as recited in claim 3, wherein the two or more wellbore centralizing elements are integrally formed with the downhole tubular.

5. The expandable metal centralizer as recited in claim 1, wherein the two or more wellbore centralizing elements are three or more wellbore centralizing elements.

6. The expandable metal centralizer as recited in claim 5, wherein the three or more wellbore centralizing elements are substantially equally circumferentially spaced about the downhole tubular.

7. The expandable metal centralizer as recited in claim 5, wherein the three or more wellbore centralizing elements extend along a length (L) of the downhole tubular.

8. The expandable metal centralizer as recited in claim 7, wherein central axes of the three or more wellbore centralizing elements are substantially parallel to a central axis of the downhole tubular.

9. The expandable metal centralizer as recited in claim 7, wherein the three or more wellbore centralizing elements spiral around the downhole tubular.

10. The expandable metal centralizer as recited in claim 1, wherein the downhole tubular includes two segments that connect with respect to each other to form a tubular.

11. The expandable metal centralizer as recited in claim 1, wherein the downhole tubular further includes one or more openings extending entirely through a wall thickness thereof for accepting a fastener for fixing the downhole tubular to the downhole conveyance.

12. The expandable metal centralizer as recited in claim 11, wherein the one or more openings are one or more threaded openings having one or more set screws therein for fixing the downhole tubular to the downhole conveyance.

13. The expandable metal centralizer as recited in claim 1, further including a pair of retaining rings positioned adjacent a proximal end and a distal end of the downhole tubular for axially fixing the downhole tubular on the downhole conveyance.

14. The expandable metal centralizer as recited in claim 13, wherein each of the pair of retaining rings includes one or more threaded openings having one or more set screws therein for axially fixing the downhole tubular to the downhole conveyance.

15. The expandable metal centralizer as recited in claim 13, wherein the pair of retaining rings allows the downhole tubular to spin about the downhole conveyance.

16. The expandable metal centralizer as recited in claim 13, wherein the pair of retaining rings does not comprise the metal configured to expand in response to hydrolysis.

17. The expandable metal centralizer as recited in claim 1, wherein the two or more wellbore centralizing elements radially extending from the downhole tubular is a single wellbore centralizing element that extends from and spirals at least 270 degrees around the downhole tubular.

18. The expandable metal centralizer as recited in claim 1, wherein the two or more wellbore centralizing elements radially extending from the downhole tubular are six or more nubs radially extending from and longitudinally spaced about the downhole tubular.

19. The expandable metal centralizer as recited in claim 1, wherein the two or more wellbore centralizing elements radially extending from the downhole tubular are six or more teeth extending from the downhole tubular.

20. The expandable metal centralizer as recited in claim 1, wherein the downhole tubular is a first downhole tubular, the two or more wellbore centralizing elements are two or more first wellbore centralizing elements, and the metal is a first metal, and further including:

a second downhole tubular positionable on the downhole conveyance in the wellbore; and one or more second wellbore centralizing elements radially extending from the downhole tubular, wherein at least one of the second downhole tubular or the one or more second wellbore centralizing elements comprises a second metal configured to expand in response to hydrolysis.

21. The expandable metal centralizer as recited in claim 1, wherein the downhole tubular is a first downhole tubular, and further including a second downhole tubular, and further wherein the two or more wellbore centralizing elements are two or more bow spring elements extending between the first and second downhole tubulars.

22. The expandable metal centralizer as recited in claim 1, wherein a combined volume of the metal is sufficient to expand to anchor one or more downhole tools within the wellbore in response to the hydrolysis.

23. The expandable metal centralizer as recited in claim 22, wherein the combined volume of the metal is sufficient to expand to anchor at least about 100,000 Newtons of weight within the wellbore.

24. The expandable metal centralizer as recited in claim 1, wherein a combined volume of the metal is sufficient to expand to seal an annulus between the downhole conveyance and wellbore casing.

25. The expandable metal centralizer as recited in claim 24, wherein the combined volume of the metal is sufficient to expand to seal at least about 1,000 psi of pressure within the annulus.

26. The expandable metal centralizer as recited in claim 1, wherein the two or more wellbore centralizing elements extend radially outward from the wellbore tubular.

27. The expandable metal centralizer as recited in claim 1, wherein the two or more wellbore centralizing elements extend radially inward from the wellbore tubular.

28. The expandable metal centralizer as recited in claim 1, wherein the downhole tubular and the two or more wellbore centralizing elements are separate features.

29. A well system, comprising:
a wellbore positioned within a subterranean formation;
a downhole conveyance located within the wellbore; and
an expandable metal centralizer coupled to the downhole conveyance, the expandable metal centralizer including;
a downhole tubular positioned on the downhole conveyance; and
two or more wellbore centralizing elements radially extending from the downhole tubular, wherein at least one of the downhole tubular or the two or more wellbore centralizing elements comprises a metal configured to expand in response to hydrolysis, wherein the downhole tubular comprises a first metal configured to expand in response to hydrolysis and the two or more wellbore centralizing elements comprise a second metal configured to expand in response to hydrolysis.

30. The well system as recited in claim 29, wherein the downhole tubular further includes one or more threaded openings having one or more set screws therein for fixing the downhole tubular to the downhole conveyance.

31. The well system as recited in claim 29, further including a pair of retaining rings positioned adjacent a proximal end and a distal end of the downhole tubular, wherein each of the pair of retaining rings includes one or more threaded openings having one or more set screws therein for axially fixing the downhole tubular to the downhole conveyance.

32. The well system as recited in claim 29, wherein the pair of retaining rings allows the downhole tubular to spin about the downhole conveyance.

33. The well system as recited in claim 29, further including wellbore casing located within the wellbore, and further wherein the downhole conveyance is located within the wellbore casing forming an annulus there between, the metal expanded to engage the wellbore casing.

34. The well system as recited in claim 29, further including a downhole tool coupled to the downhole conveyance downhole of the expandable metal centralizer.

35. The well system as recited in claim 29, wherein the downhole tubular and the two or more wellbore centralizing elements are separate features.

36. A method for centralizing a downhole conveyance, the method comprising:
positioning a downhole conveyance at a desired location within wellbore casing located within a wellbore of a subterranean formation, the downhole conveyance having a pre-expansion expandable metal centralizer coupled thereto, the pre-expansion expandable metal centralizer including;
a downhole tubular positioned on the downhole conveyance; and
two or more wellbore centralizing elements radially extending from the downhole tubular, wherein at least one of the downhole tubular or the two or more wellbore centralizing elements comprises a metal configured to expand in response to hydrolysis, wherein the downhole tubular comprises a first metal configured to expand in response to hydrolysis and the two or more wellbore centralizing elements comprise a second metal configured to expand in response to hydrolysis; and
subjecting the pre-expansion expandable metal centralizer to a wellbore fluid to expand the metal into contact with the wellbore casing.

37. The method as recited in claim 36, wherein the metal is configured to expand in response to one of magnesium hydrolysis, aluminum hydrolysis, calcium hydrolysis, and calcium oxide hydrolysis.

38. The method as recited in 36, wherein the hydrolysis forms a structure comprising one of a Brucite, Gibbsite, bayerite, and norstrandite.

39. The method as recited in claim 36, wherein the metal is a magnesium alloy or a magnesium alloy alloyed with at least one of Al, Zn, Mn, Zr, Y, Nd, Gd, Ag, Ca, Sn, and Re.

40. The method as recited in claim 36, wherein the downhole tubular and the two or more wellbore centralizing elements are separate features.

* * * * *